(No Model.)
W. N. ALDRICH.
SELF WINDING REEL FOR CHECK ROW PLANTERS.
No. 398,872. Patented Mar. 5, 1889.
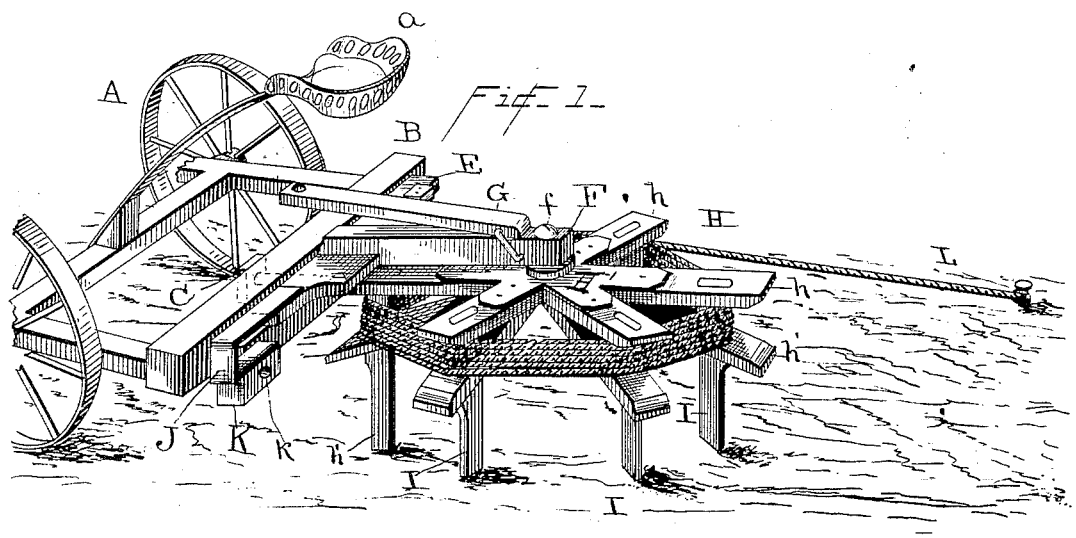
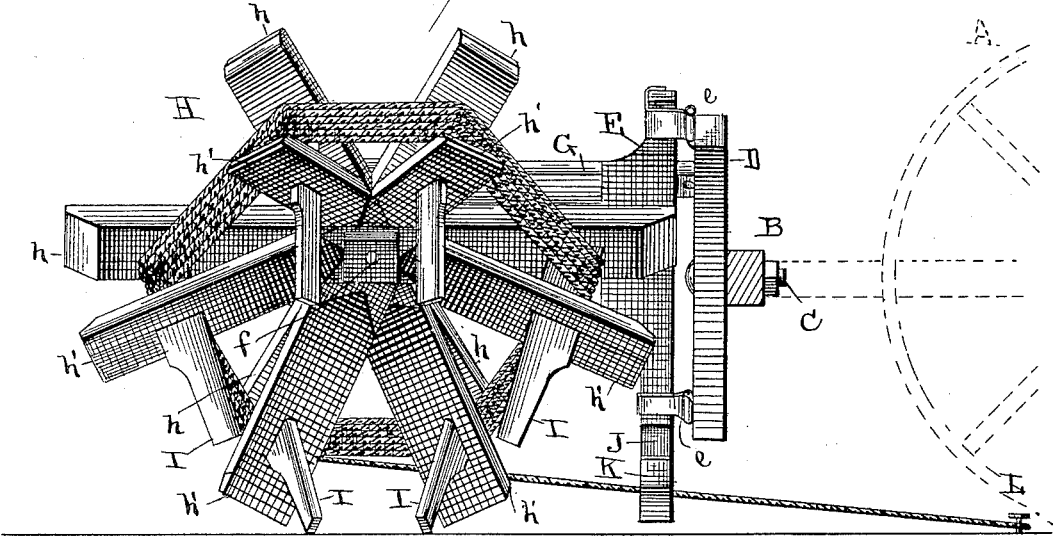
WITNESSES
Lorris A. Clark.
A. S. McCoy.
INVENTOR
William N. Aldrich
By his Attorneys
Whittlesey Wright

United States Patent Office.

WILLIAM N. ALDRICH, OF RED OAK, IOWA.

SELF-WINDING REEL FOR CHECK-ROW PLANTERS.

SPECIFICATION forming part of Letters Patent No. 398,872, dated March 5, 1889.

Application filed October 18, 1888. Serial No. 288,425. (No model.)

*To all whom it may concern:*

Be it known that I, WILLIAM N. ALDRICH, a citizen of the United States, residing at Red Oak, in the county of Montgomery and State of Iowa, have invented certain new and useful Improvements in Self-Winding Check-Line Reels for Check-Row Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to corn-planters; and its object is to provide check-row planters with a reel which will automatically wind up the line in the operation of planting.

In the drawings, Figure 1 is a perspective view showing the rear portion of a corn-planter having my reel attached thereto, as arranged when paying out the check-line; and Fig. 2 is a side elevation of the reel in the act of winding up the line.

The rear part of the planter A is provided with a cross-beam, B, to which the reel is adjustably attached by a clamping device—such as a bolt, C—passing horizontally through the beam and through a suitable hole in the cross-bar D, which is thereby rendered capable of vibration in a vertical plane transverse to the longitudinal axis of the planter. The frame of the reel is T-shaped, being composed of a base-piece, E, to the middle of which is fastened an arm, F, projecting rearwardly at right angles to the base-piece, which is itself flexibly attached to the cross-bar D by hinges e e. Near the outer end of the arm F is hinged an arm or bar, G, which can be pulled up and fastened to the seat a of the planter when it is desired to lift the reel clear of the ground.

Through the outer end of the arm F passes a bolt, $f$, on which is mounted the reel H, consisting of a series of radial arms, $h$, rigidly fastened to a plate or spider, H', and meeting at the center. In the same radial plane with each arm $h$ is an auxiliary arm, $h'$, united to the arm $h$ at its inner end, but diverging therefrom outwardly, so as to leave a V-shaped space between them. Through the outer ends of each pair of arms $h$ $h'$ passes a finger, I, firmly secured to the arms and projecting considerably beyond the face of the auxiliary arm $h'$. The check-line is wound on the fingers I between the arms $h$ $h'$.

To one end of the base-piece E is fastened a strap, J, of iron or other metal, which projects outwardly in line with the base-piece, then bends downwardly, and then back on itself, forming a support for a block, K, which is fastened to the under side of the end of the strap, and is provided with an eye, $k$, through the check-line, if rove, when being wound up.

The operation of my device is as follows: While on the road the reel is lifted clear of the ground by means of a rope or chain fastened to the seat $a$. Upon reaching the field the stake L, to which the end of the line is made fast, is driven into the ground, and the reel is lowered until the ends of all the fingers I rest on the ground. As the reel is dragged across the field, the line is paid out directly from the reel, being stretched tight under the tension produced by the friction of the fingers upon the earth. The tension can be regulated by lifting or lowering the reel by means of the bar G. Arriving at the other side of the field, the planter is faced about, and the reel is set at an angle of about forty-five degrees, the bolt C being loosened to allow the cross-bar D to be swiveled upon it to the proper angle, and then tightened again to clamp the cross-bar. In this position the fingers I on one side are lifted off the ground, while on the lower side of the reel only two or three of the fingers touch the ground, as clearly shown in Fig. 2. Upon traversing the planter back toward the stake L the line, passing through the eye $k$ and between the horses, is wound up on the reel, which is revolved on the bolt $f$ like a wheel. As the planter is drawn along over the line, its mechanism is operated by the check-line in the usual manner.

Having thus described my invention, what I claim, and desire to secure by Letters Patent, is—

1. The combination, with a check-row planter, of a check-line reel united thereto by a swivel-joint the axis of which lies horizontally, substantially as set forth.

2. The combination, with the check-row planter, of a check-line reel hinged to a crossbar which is united to the planter by a swivel-joint, so as to be capable of vibration in a vertical plane transverse to the longitudinal axis of the planter, substantially as set forth.

3. A check-line reel composed of a crossbar, D, a base-piece E, hinged thereto, an arm, F, fastened to the base-piece and carrying a bolt, $f$, and a reel, H, mounted to revolve on the bolt and provided with projecting fingers I, as set forth.

4. A check-line reel composed of a crossbar, D, a base-piece, E, hinged thereto, an arm, F, fastened to the base-piece and carrying a bolt, $f$, a bar, G, hinged to the arm F, a reel, H, mounted on the bolt $f$, and a block, K, attached to the base-piece and provided with an eye, $k$, substantially as described.

In testimony whereof I affix my signature in presence of two witnesses.

WILLIAM N. ALDRICH.

Witnesses:
JOHN F. ZIMMERMAN,
JOSEPH M. JUNKIN.